(12) United States Patent
Lee

(10) Patent No.: US 6,888,603 B2
(45) Date of Patent: May 3, 2005

(54) IPS-LCD WITH A COMPENSATION STRUCTURE FOR REDUCING TRANSMITTANCE DIFFERENCE

(75) Inventor: Deuk Su Lee, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/870,460

(22) Filed: Jun. 18, 2004

(65) Prior Publication Data

US 2004/0239860 A1 Dec. 2, 2004

Related U.S. Application Data

(62) Division of application No. 10/282,027, filed on Oct. 29, 2002, now Pat. No. 6,812,987.

(51) Int. Cl.$^7$ ............................................. G02F 1/1343
(52) U.S. Cl. ........................ 349/141; 349/139; 349/143
(58) Field of Search ................................ 349/129, 139, 349/141, 143

(56) References Cited

U.S. PATENT DOCUMENTS

| 6,256,081 | B1 | * | 7/2001 | Lee et al. ................... 349/141 |
| 6,297,886 | B1 | | 10/2001 | Cornell ..................... 358/1.12 |
| 6,512,565 | B1 | | 1/2003 | Lee et al. ................... 349/130 |
| 6,795,150 | B2 | * | 9/2004 | Yanagawa et al. .......... 349/141 |
| 6,801,287 | B2 | * | 10/2004 | Kurahashi et al. .......... 349/141 |
| 2002/0154262 | A1 | * | 10/2002 | Yamakita et al. ........... 349/141 |

* cited by examiner

*Primary Examiner*—Tarifur R. Chowdhury
(74) *Attorney, Agent, or Firm*—Rabin & Berdo, P.C.

(57) ABSTRACT

An IPS-LCD with a compensation structure for CD variation. The IPS-LCD panel includes a plurality of pixels wherein each pixel has parallel pixel electrodes and parallel common electrodes positioned such that a respective pixel electrode is disposed adjacent and parallel to a respective common electrode. This panel is characterized in that each spacing between any adjacent common electrode and pixel electrode in one pixel is equal to and different from that of the adjacent pixel.

4 Claims, 7 Drawing Sheets

IPS-LCD WITH A COMPENSATION STRUCTURE FOR REDUCING TRANSMITTANCE DIFFERENCE

This application is a Divisional Application of application Ser. No. 10/282,027 filed Oct. 29, 2000 now U.S. Pat. No. 6,812,987.

BACKGROUND OF THE INVENTION

1. Field of the Invention

The present invention relates to an in-plane switching liquid display (IPS-LCD), more particularly, the present invention relates to an IPS-LCD with a compensation structure for critical dimension (CD) variation.

2. Description of the Related Art

Liquid crystal displays (LCDs) may be classified by the orientation of the liquid crystal molecules between the spaced glass substrates. In a conventional twisted nematic LCD (TN-LCD), the liquid crystal molecules are twisted between the two substrates. In contrast, in an in-plane switching LCD (IPS-LCD), common electrodes and pixel electrodes are formed on a lower glass substrate (TFT substrate) and an in-plane electrode field therebetween is generated to rearrange the liquid crystal molecules along the electrode field. Accordingly, the IPS-LCD has been used or suggested for improving drawbacks of the conventional TN-LCD, such as a very narrow viewing angle and a low contrast ratio.

FIGS. 1A and 1B are sectional diagrams of a conventional IPS-LCD, in which FIG. 1A shows the alignment of the liquid crystal molecules in an off state and FIG. 1B shows the alignment of the liquid crystal molecules in an on state. The IPS-LCD has a lower glass substrate 10, an upper glass substrate 12, and a liquid crystal layer 14 disposed in a spacing between the two parallel glass substrates 10 and 12. On the lower glass substrate 10, serving as a TFT substrate, a plurality of strip-shaped common electrodes 16 is patterned on the lower glass substrate 10, an insulating layer 18 is deposited on the common electrodes 16 and the lower glass substrate 10, and a plurality of strip-shaped pixel electrodes 20 is patterned on the insulating layer 18.

As shown in FIG. 1A, before an external voltage is applied to the IPS-LCD, the negative liquid crystal molecules 14A are aligned in a direction parallel to the lower glass substrate 10. As shown in FIG. 1B, when an external voltage is applied to the IPS-LCD, an in-plane electric field is generated between the common electrode 16 and the pixel electrode 20, resulting in a rotation of the liquid crystal molecules 14B toward the in-plane electric field.

Generally, the common electrode 16 and the pixel electrode 20 are formed on the same or different layers and arranged apart from each other by a predetermined distance, known as "spacing". For example, FIG. 2 shows a cross-section of a glass substrate having common electrodes and pixel electrodes thereon. The common electrodes 16 and the pixel electrodes 20 have a width of about 4.0 μm. The common electrodes 16 in the edge have a width of about 8.0 μm. Each spacing between a respective common electrode 16 and a respective pixel electrode 20 is about 9.0 μm in the same pixel and the adjacent pixel.

However, critical dimension (CD) variation is easily generated during formation of the common electrodes 16 and the pixel electrodes 20 caused by many parameters such as different substrate flatness, different resist thickness, and different etching recipe.

FIG. 3 is a top view showing muras on an IPS-LCD panel caused by CD variation at area B. The IPS-LCD panel 100 having area A and area B is disposed in an outer frame 102. A plurality of muras 104, curved spots, are generated on the panel 100 caused by localized CD variation.

Next, FIG. 4 shows a more detailed diagram to explain muras caused by CD variation and shows a pixel array including area A and area B having CD variation according to the prior art.

As shown in area A of FIG. 4, the pixel array comprises a plurality of small rectangles having the same numeral (10.00). Each small rectangle denotes one unit pixel that has parallel pixel electrodes 20 and parallel common electrodes 16 positioned such that a respective pixel electrode 20 is disposed adjacent and parallel to a respective common electrode 16. The numeral (10.00) in one small rectangle represents the spacing between any adjacent common electrode 16 and pixel electrode 20. The spacing between any adjacent common electrode 16 and pixel electrode 20 in the same pixel is equal to that of the adjacent pixel. For example, the spacing between any adjacent common electrode 16 and pixel electrode 20 is 10.00 μm in the pixel 30.

Turning now to area B of FIG. 4, area B shows a pixel array, having spacing CD variation of about 0.30 μm. The pixel array comprises a plurality of small rectangles having numeral (10.30) respectively. Each small rectangle denotes one unit pixel that has parallel pixel electrodes 22 and parallel common electrodes 28 positioned such that a respective pixel electrode 22 is disposed adjacent and parallel to a respective common electrode 28. The numeral (10.30) in one small rectangle represents the spacing between any adjacent common electrode 28 and pixel electrode 22. The spacing between any adjacent common electrode 28 and pixel electrode 22 in the same pixel is equal to that of the adjacent pixel. For example, the spacing between any adjacent common electrode 28 and pixel electrode 22 is 10.30 μm in the pixel 40.

FIG. 5 is a three-dimensional diagram showing transmittance difference between area A and area B according to the prior art. In FIG. 5, Z-axle represents transmittance (%), X-axle and Y-axle mean pixel unit of the pixel array of FIG. 4 including area A and area B.

FIG. 5 shows obvious transmittance difference between area A and area B so that an observer can perceive the apparent luminance difference.

Therefore, improved IPS-LCD panels formed on an active matrix substrate with a compensation structure for CD variation are needed.

SUMMARY OF THE INVENTION

In view of the above disadvantages, an object of the invention is to provide an IPS-LCD with a compensation structure for CD variation. According to the IPS-LCD, the transmittance difference between the two pixels can be reduced.

In accordance with one aspect of the invention, there is provided an IPS-LCD with a compensation structure for CD variation. The IPS-LCD comprises a first substrate; a first pixel, formed on the first substrate, having first parallel pixel electrodes and first parallel common electrodes positioned such that a respective pixel electrode is disposed adjacent and parallel to a respective common electrode; and a second pixel adjacent to the first pixel, wherein the second pixel has second parallel pixel electrodes and second parallel common electrodes positioned such that a respective pixel electrode is disposed adjacent and parallel to a respective common electrode. This LCD is characterized in that each spacing between any adjacent first common electrode and first pixel electrode is equal and has a first distance, each spacing between any adjacent second common electrode and second pixel electrode is equal and has a second distance different from the first distance. Furthermore, the IPS-LCD comprises a second substrate being opposed to the first substrate and a liquid crystal material being interposed between the first substrate and the second substrate.

In accordance with another aspect of the invention, the difference between the first distance and the second distance is preferably about 0.25*X μm, X=1, 2, 3, or 4. That is to say, the difference between the first distance and the second distance is 0.25, 0.50, 0.75 or 1.00 μm.

Furthermore, the first parallel pixel electrodes and the first parallel common electrodes are separately formed on the different layers. Otherwise, the first parallel pixel electrodes and the first parallel common electrodes can be formed on the same layer.

Furthermore, the first distance and the second distance can be about 10.00 μm to 11.30 μm, for example 10.00 μm, 10.25 μm, 10.50 μm, 10.75 μm, or 11.00 μm.

In accordance with a further aspect of the invention, there is provided an IPS-LCD with a compensation structure for CD variation. The IPS-LCD comprises a plurality of pixels wherein each pixel has parallel pixel electrodes and parallel common electrodes positioned such that a respective pixel electrode is disposed adjacent and parallel to a respective common electrode. This IPS-LCD is characterized in that each spacing between any adjacent common electrode and pixel electrode in one pixel is equal to and different from that of the adjacent pixel.

In accordance with yet another aspect of the invention, there is provided an IPS-LCD with a compensation structure for CD variation. The IPS-LCD comprises a pixel having a plurality of parallel pixel electrodes and a plurality of parallel common electrodes positioned such that a respective pixel electrode is disposed adjacent and parallel to a respective common electrode. This panel is characterized in that each spacing between any adjacent common electrode and pixel electrode in the pixel is not equal.

BRIEF DESCRIPTION OF THE DRAWINGS

The preferred embodiment of the invention is hereinafter described with reference to the accompanying drawings in which.

DETAILED DESCRIPTION OF THE INVENTION

First Embodiment

Figures 1A, 1B:
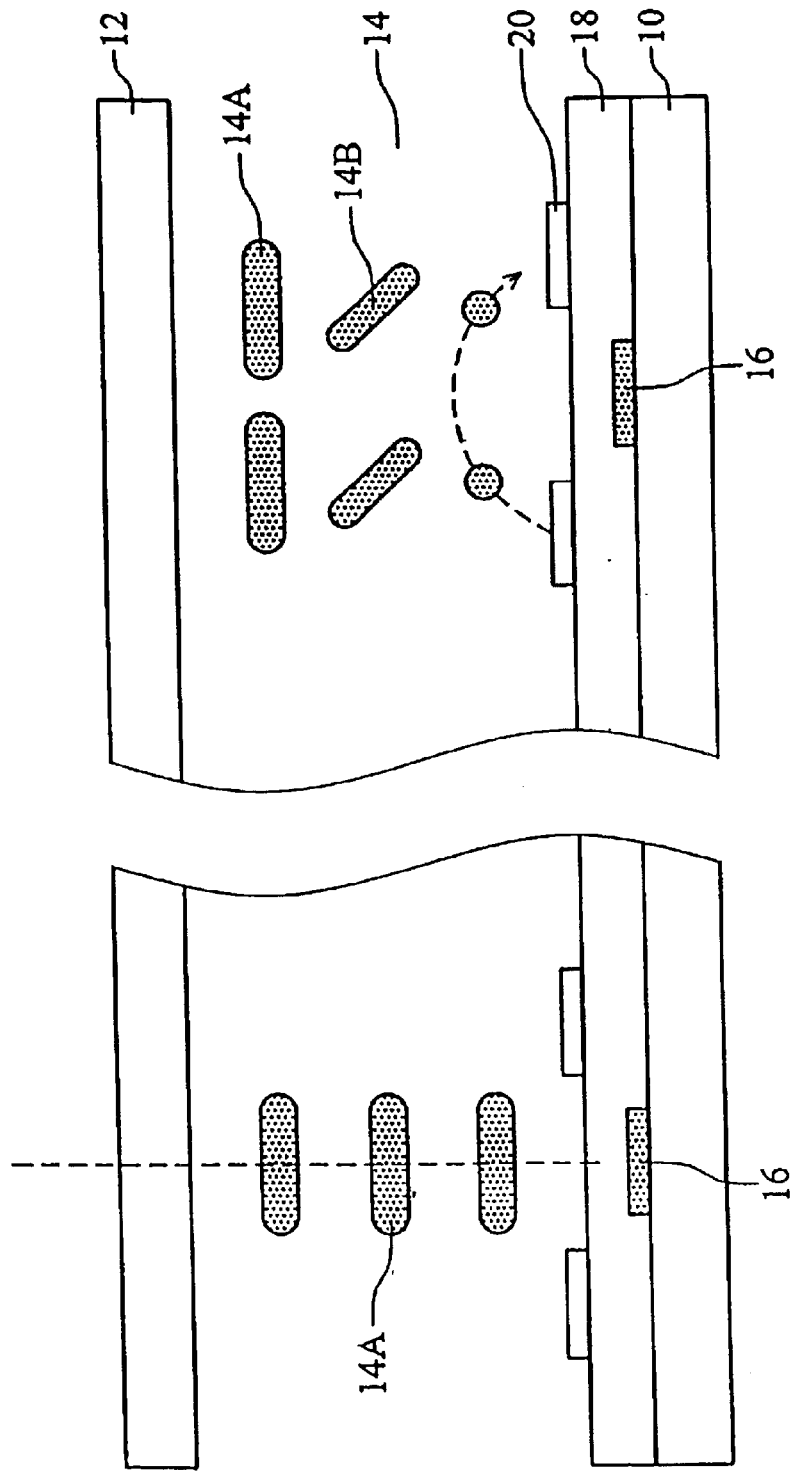
FIG. 1A is a cross-section showing the alignment of the liquid crystal molecules in an off state according to the conventional IPS-LCD.
FIG. 1B is a cross-section showing the alignment of the liquid crystal molecules in an on state according to the conventional IPS-LCD.
Figure 2:
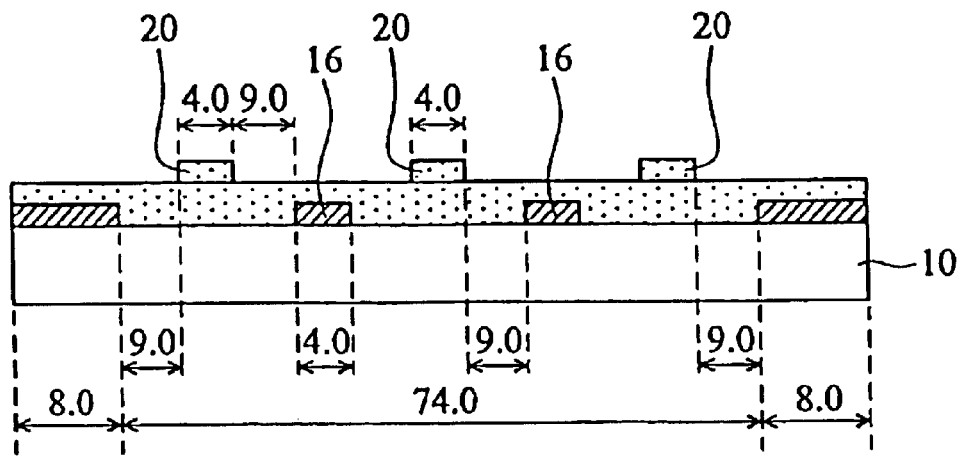
FIG. 2 is a cross-section showing a glass substrate having common electrodes and pixel electrodes thereon according to the prior art.
Figure 3:
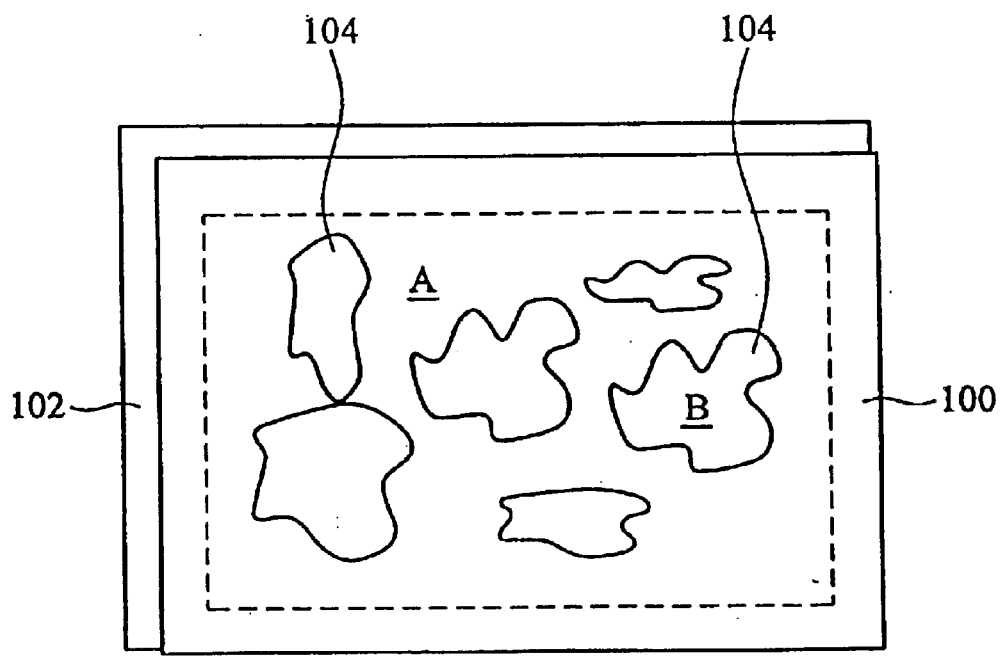
FIG. 3 is a top view showing muras on an IPS panel caused by CD variation at area B.
Figure 4:
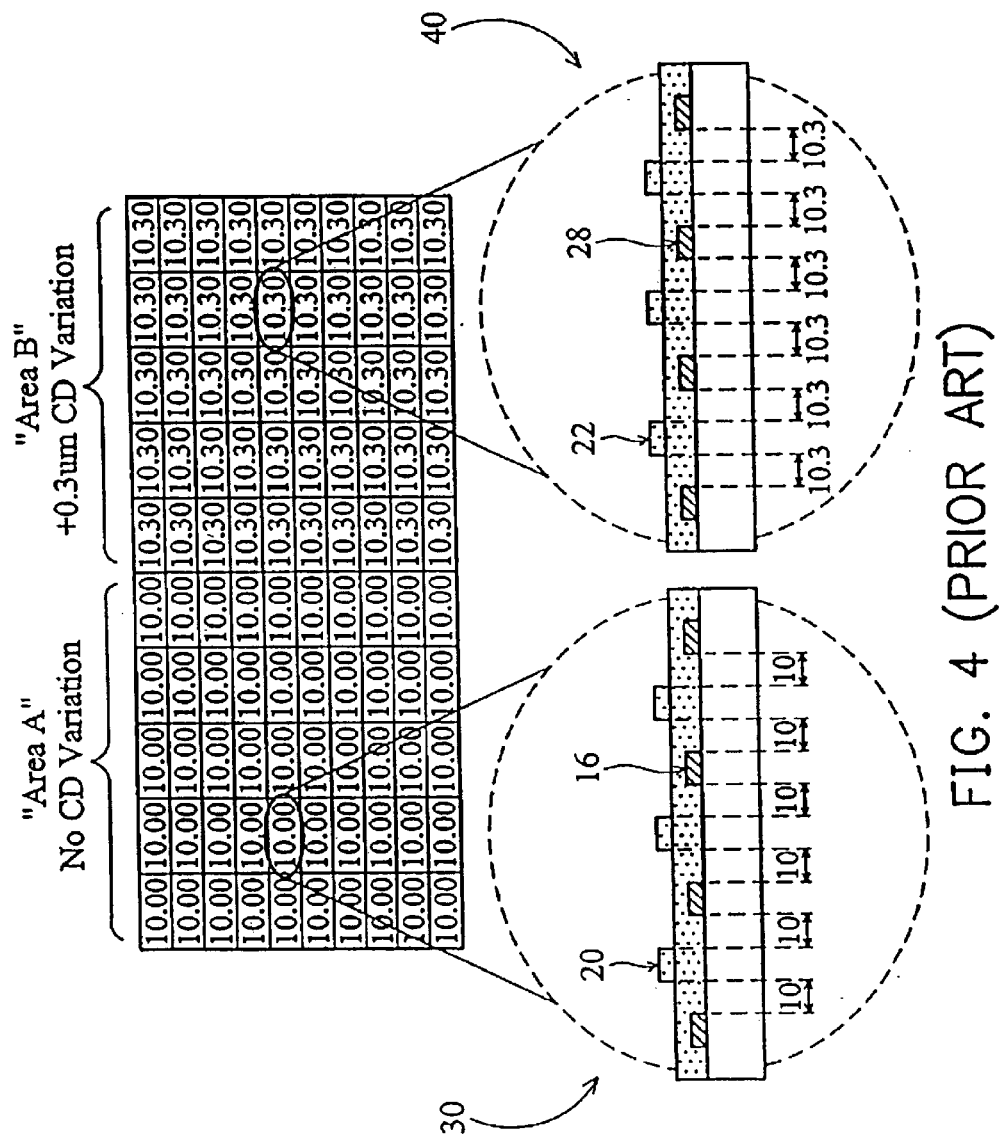
FIG. 4 is a diagram showing a pixel array including area A and area B having CD variation according to the prior art.
Figure 5:
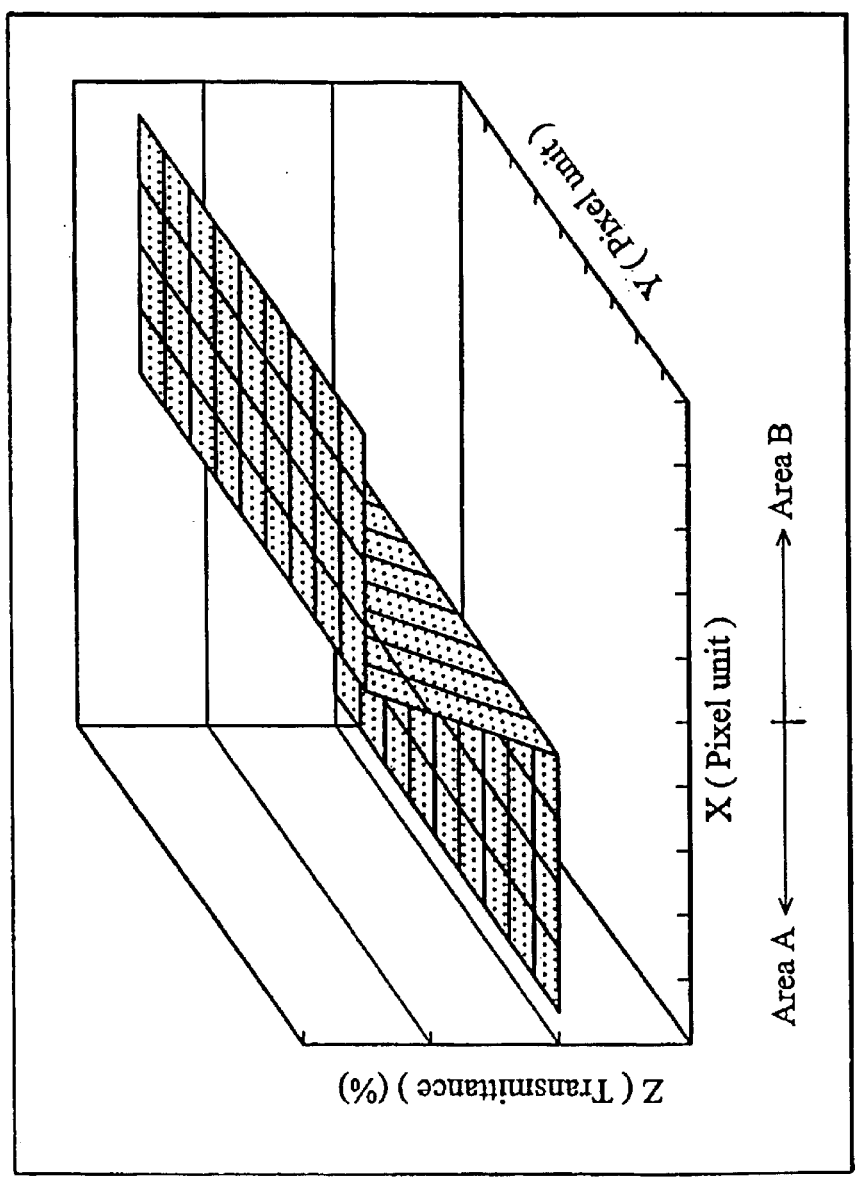
FIG. 5 is a three-dimensional diagram showing transmittance difference between area A and area B according to the prior art.
Figure 6:
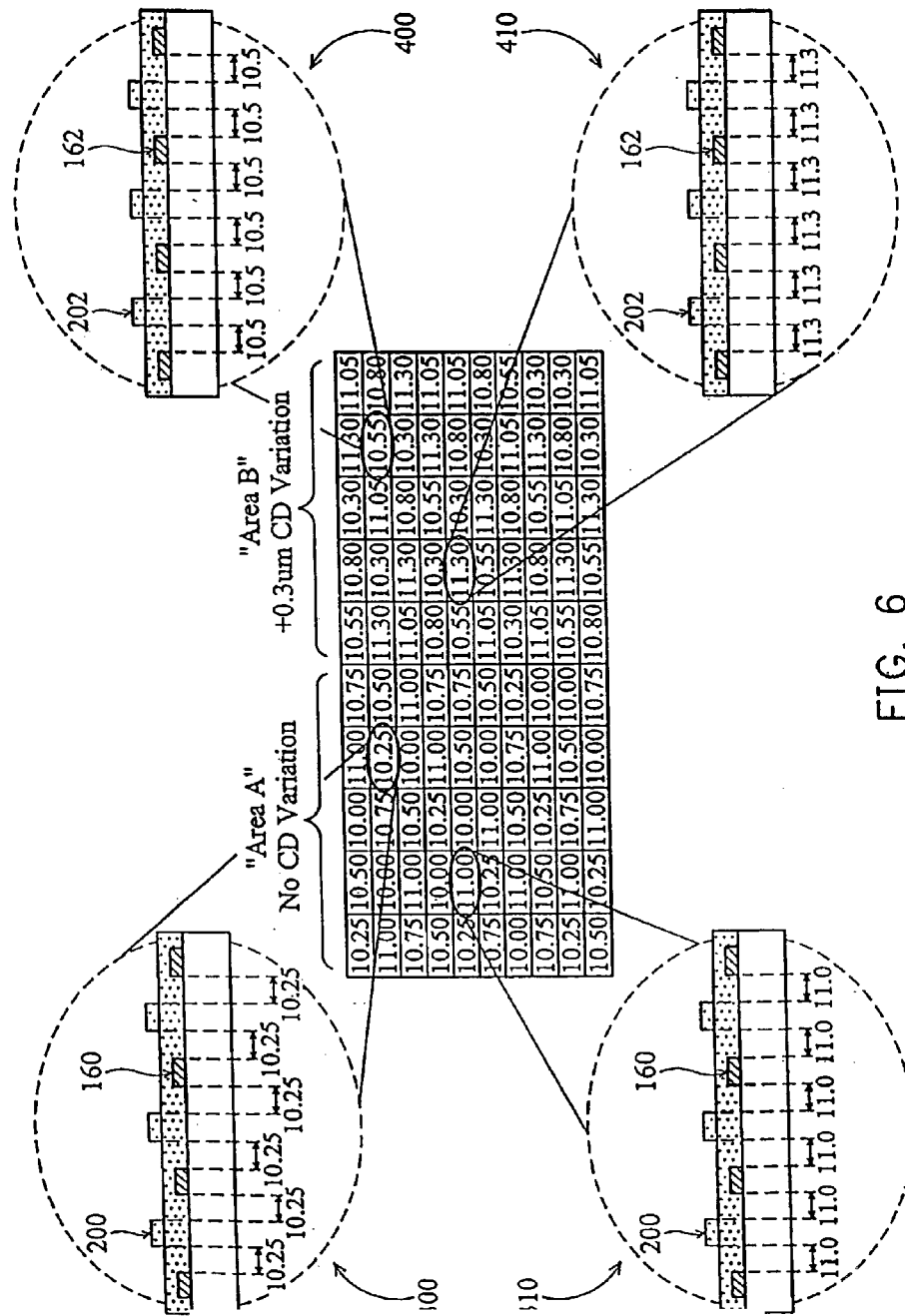
FIG. 6 is a diagram showing a pixel array including area A and area B having CD variation according to the first embodiment of the invention.

FIG. 6 is a diagram showing a pixel array including area A and area B having CD variation according to the first embodiment of the invention.

As shown in area A of FIG. 6, the pixel array comprises a plurality of small rectangles having numerals (10.00, 10.25, 10.50, 10.75, or 11.00) respectively. Each small rectangle denotes one unit pixel that has parallel pixel electrodes 200 and parallel common electrodes 160 positioned such that a respective pixel electrode 200 is disposed adjacent and parallel to a respective common electrode 160. The numeral in one small rectangle represents the spacing between any adjacent common electrode 160 and pixel electrode 200. In this embodiment, the spacing between any adjacent common electrode 160 and pixel electrode in the same pixel is equal to and different from that in the adjacent pixel. For example, the spacing between any adjacent common electrode 160 and pixel electrode 200 is 10.25 μm in the pixel 300. The spacings of the pixels adjacent to the pixel 300 are 11.00 μm, 10.50 μm, 10.00 μm, and 10.75 μm respectively. Alternately, the spacing between any adjacent common electrode 160 and pixel electrode 200 is 11.00 μm in the pixel 310. The spacings of the pixels adjacent to the pixel 310 are 10.00 μm, 10.00 μm, 10.25 μm, and 10.25 μm. That is to say, the spacings (10.00 μm, 10.25 μm, 10.50 μm, 10.75 μm, or 11.00 μm) in the plurality of pixels are randomly arranged. Also, the difference between any two spacings is about 0.25*X μm, X=1, 2, 3, or 4.

Turning now to area B of FIG. 6, area B shows a pixel array, having spacing CD variation of about 0.30 μm. It is repeated based on area A. The pixel array comprises a plurality of small rectangles having numerals (10.30, 10.55, 10.80, 11.05, or 11.30) respectively. Each small rectangle denotes one unit pixel that has parallel pixel electrodes 202 and parallel common electrodes 162 positioned such that a respective pixel electrode 202 is disposed adjacent and parallel to a respective common electrode 162. The numeral in one small rectangle represents the spacing between any adjacent common electrode 162 and pixel electrode 202. In this embodiment, the spacing between any adjacent common electrode 162 and pixel electrode in the same pixel is equal to and different from that of the adjacent pixel. For example, the spacing between any adjacent common electrode 162 and pixel electrode 202 is 10.55 μm in the pixel 400 corresponding to the pixel 300 in area A. The spacings of the pixels adjacent to the pixel 400 are from 10.00 μm to 11.30 μm. For example, the spacings are 11.30 μm, 10.80 μm, 10.30 μm, and 11.05 μm respectively. The spacing between any adjacent common electrode 162 and pixel electrode 202 is 11.30 μm in the pixel 410 corresponding to the pixel 310 in area A. The spacings of the pixels adjacent to the pixel 410 are from 10.00 to 11.30 μm. For example, the spacings are 10.30 μm, 10.30 μm, 10.55 μm, and 10.55 μm, respectively. That is to say, the spacings (10.30 µm, 10.55 µm, 10.80 µm, 11.05 µm, or 11.30 µm) in the plurality of pixels are randomly arranged. Also, the difference between any two spacings is about 0.25*X µm, X=1, 2, 3, or 4.

Figure 7:
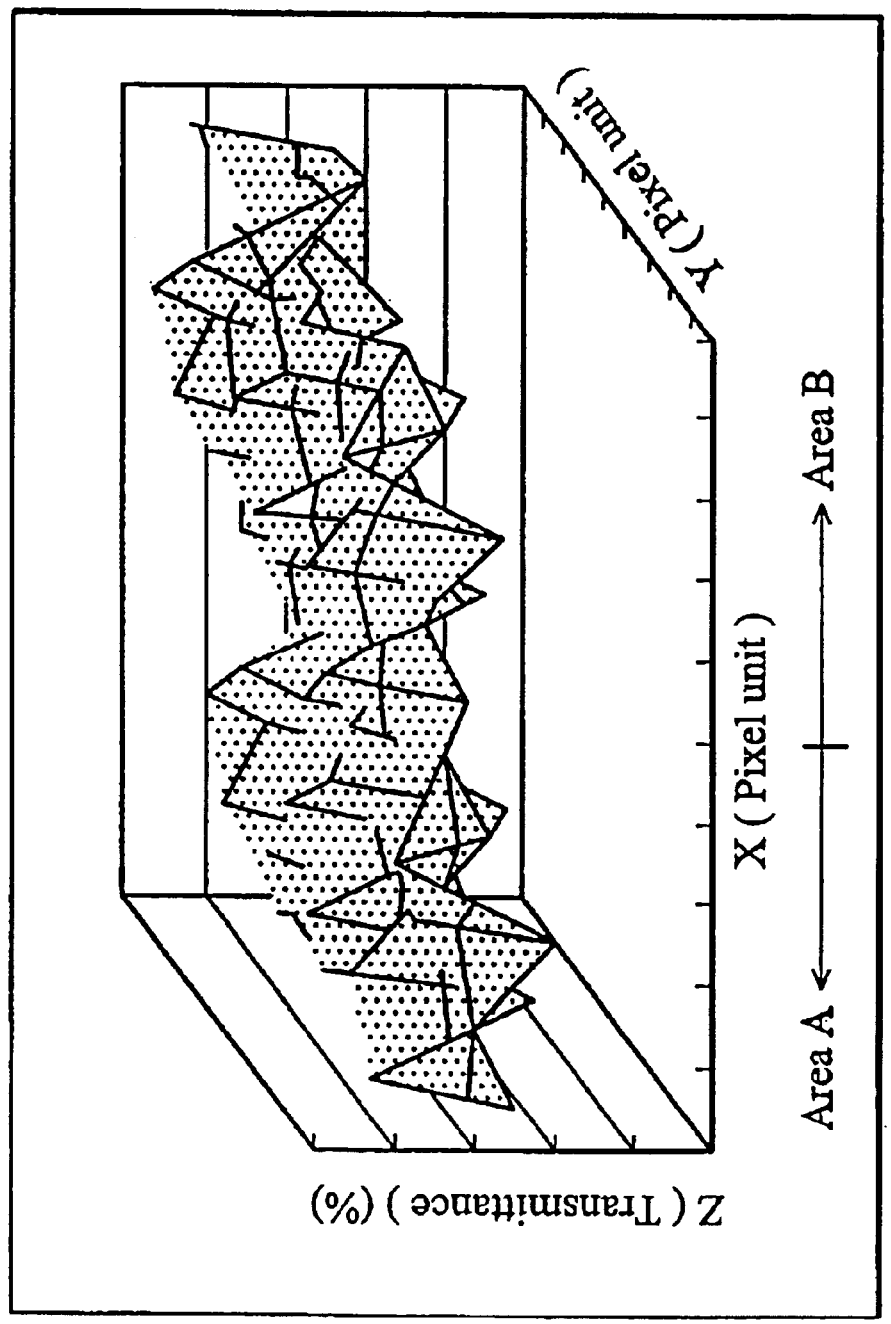
FIG. 7 is a three-dimensional diagram showing transmittance difference between area A and area B according to the first embodiment of the invention.

FIG. 7 shows transmittance difference between area A and area B according to the first embodiment of the invention. In FIG. 7, Z-axle represents transmittance (%), X-axle and Y-axle mean pixel unit of the pixel array of FIG. 6 including area A and area B.

According to the embodiment of the invention, the localized transmittance difference between area A and area B with CD variation can be drastically reduced.

Second Embodiment

Figures 8A, 8B:
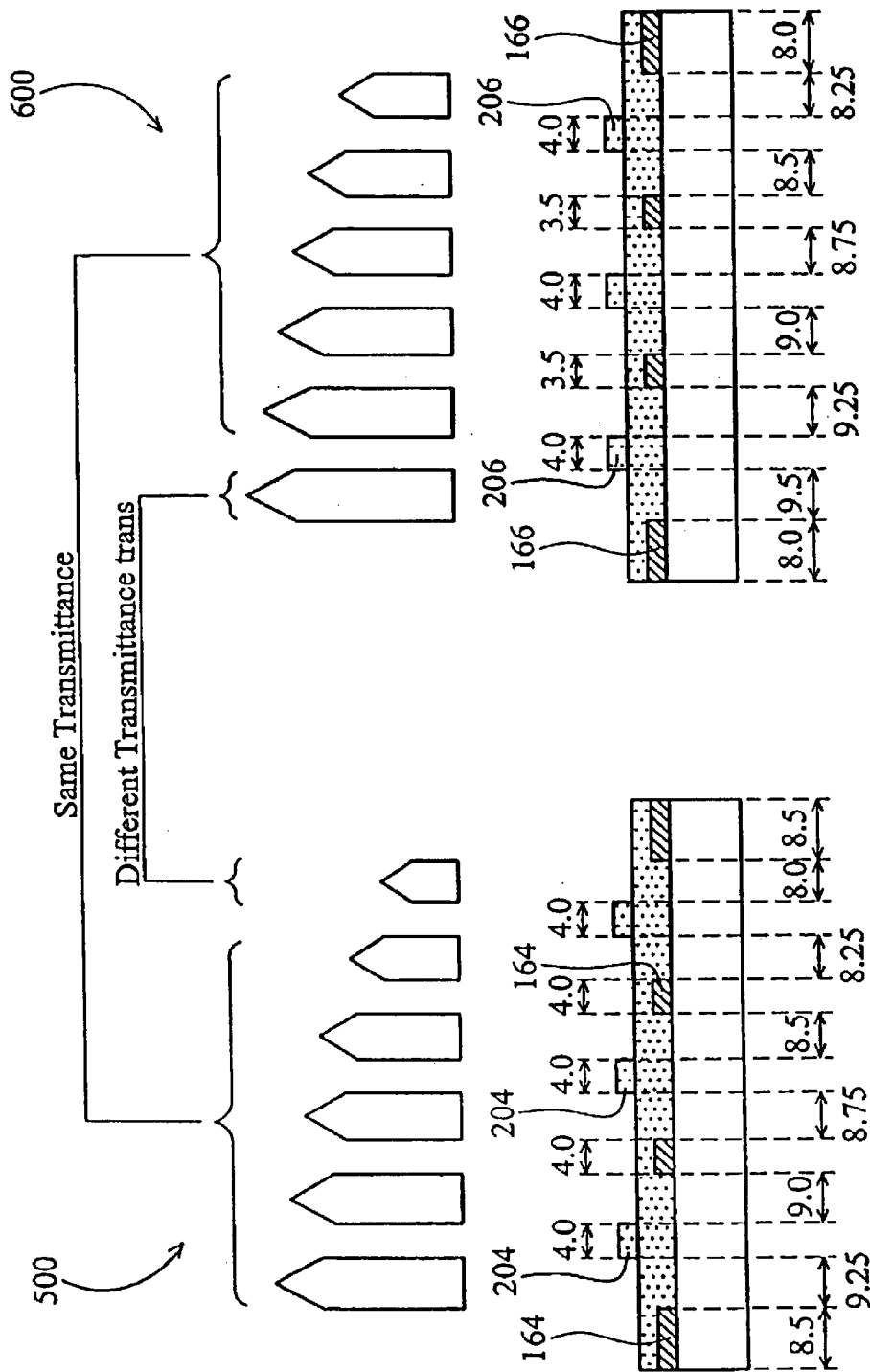
FIG. 8A is a diagram showing a glass substrate having common electrodes and pixel electrodes thereon in one pixel according to the second embodiment of the invention.
FIG. 8B is a diagram showing a glass substrate having common electrodes and pixel electrodes thereon in another pixel according to the second embodiment of the invention.

FIG. 8A is a diagram showing a glass substrate having common electrodes and pixel electrodes thereon in one pixel according to the second embodiment of the invention.

In FIG. 8A, the pixel 500 has a plurality of parallel pixel electrodes 204 and a plurality of parallel common electrodes 164 positioned such that a respective pixel electrode 204 is disposed adjacent and parallel to a respective common electrode 164. The common electrodes 164 have a width of about 4.0 µm in the central portion and a width of about 8.5 µm in edge portion. The pixel electrodes 204 have a width of about 4.0 µm. Each spacing between any adjacent common electrode 164 and pixel electrode 204 in the pixel 500 is not equal. The spacings in this pixel 500 are respectively 9.25 µm, 9.0 µm, 8.75 µm, 8.5 µm, 8.25 µm, and 8.0 µm so that the transmittance in the pixel 500 is variable at different positions.

FIG. 8B is a diagram showing a glass substrate having common electrodes and pixel electrodes thereon in another pixel having CD variation in metal for common electrode.

In FIG. 8B, the pixel 660 has a plurality of parallel pixel electrodes 208 and a plurality of parallel common electrodes 166 positioned such that a respective pixel electrode 206 is disposed adjacent and parallel to a respective common electrode 166. The common electrodes 166 have a width of about 3.5 µm (CD variation) in the central portion and a width of about 8.0 µm in the edge portion. The pixel electrodes 206 have a width of about 4.0 µm. Each spacing between any adjacent common electrode 166 and pixel electrode 206 in the pixel 600 is not equal. The spacings in this pixel 600 are respectively 9.5 µm, 9.25 µm, 9.0 µm, 8.75 µm, 8.5 µm, and 8.25 µm so that the transmittance in the pixel 500 is variable at different positions. Therefore, the transmittance difference between the pixel 500 and pixel 600 with CD variation can be reduced.

While the invention has been described with reference to various illustrative embodiments, the description is not intended to be construed in a limiting sense. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. An IPS-LCD with a compensation structure for CD variation, comprising:
    at least one pixel having a plurality of parallel pixel electrodes and a plurality of parallel common electrodes positioned such that a respective pixel electrode is disposed adjacent and parallel to a respective common electrode;
    wherein each spacing between any adjacent common electrode and pixel electrode in the pixel is not equal.

2. An IPS-LCD with a compensation structure for CD variation as claimed in claim 1, wherein the spacings are different from each other by a distance of about 0.25*X µm, X=1, 2, 3, or 4.

3. An IPS-LCD with a compensation structure for CD variation as claimed in claim 1, wherein the parallel pixel electrodes and the parallel common electrodes are separately formed on the different layers.

4. An IPS-LCD with a compensation structure for CD variation as claimed in claim 1, wherein the spacing is about 10.00 µm to 11.30 µm.

* * * * *